(12) United States Patent
Assa et al.

(10) Patent No.: US 12,361,934 B2
(45) Date of Patent: Jul. 15, 2025

(54) BOOSTING WORDS IN AUTOMATED SPEECH RECOGNITION

(71) Applicant: Snap Inc., Santa Monica, CA (US)

(72) Inventors: Jacob Assa, New York, NY (US); Alan Bekker, Givaat Shmuel (IL); Zach Moshe, Tel Aviv (IL)

(73) Assignee: Snap Inc., Santa Monica, CA (US)

( * ) Notice: Subject to any disclaimer, the term of this patent is extended or adjusted under 35 U.S.C. 154(b) by 399 days.

(21) Appl. No.: 17/864,937

(22) Filed: Jul. 14, 2022

(65) Prior Publication Data

US 2024/0021195 A1 Jan. 18, 2024

(51) Int. Cl.
| | |
|---|---|
| *G10L 15/197* | (2013.01) |
| *G10L 15/10* | (2006.01) |
| *G10L 15/187* | (2013.01) |
| *G10L 15/22* | (2006.01) |

(52) U.S. Cl.
CPC ............ *G10L 15/197* (2013.01); *G10L 15/10* (2013.01); *G10L 15/187* (2013.01); *G10L 15/22* (2013.01)

(58) Field of Classification Search
CPC ..... G10L 15/197; G10L 15/10; G10L 15/187; G10L 15/22; G06F 40/284
See application file for complete search history.

(56) References Cited

U.S. PATENT DOCUMENTS

| | | | |
|---|---|---|---|
| 5,604,843 A | 2/1997 | Shaw et al. | |
| 5,689,559 A | 11/1997 | Park | |
| 5,715,369 A | 2/1998 | Spoltman et al. | |
| 5,799,273 A | 8/1998 | Mitchell et al. | |
| 5,857,099 A | 1/1999 | Mitchell et al. | |
| 5,867,817 A | 2/1999 | Catallo et al. | |
| 5,880,731 A | 3/1999 | Liles et al. | |

(Continued)

FOREIGN PATENT DOCUMENTS

| | | |
|---|---|---|
| CA | 2879685 A1 | 9/2013 |
| CN | 107851319 A | 3/2018 |

(Continued)

OTHER PUBLICATIONS

Ko et al. "Look at the first sentence: Position bias in question answering." arXiv preprint arXiv:2004.14602 (2020). (Year: 2020).*

(Continued)

*Primary Examiner* — Pierre Louis Desir
*Assistant Examiner* — Keisha Y. Castillo-Torres
(74) *Attorney, Agent, or Firm* — Schwegman Lundberg & Woessner, P.A.

(57) ABSTRACT

Systems and methods are provided for performing automated speech recognition. The systems and methods perform operations comprising: accessing a language model that includes a plurality of n-grams, each of the plurality of n-grams comprising a respective sequence of words and corresponding LM score; selecting a target word to boost in the language model; receiving a boosting factor for the target word; identifying a target n-gram in the language model that includes the target word; identifying a subset of n-grams of the plurality of n-grams that include words in a portion of the target n-gram; and adjusting the LM score of the target n-gram based on the LM scores of the subset of n-grams and the boosting factor.

20 Claims, 10 Drawing Sheets

(56) References Cited

U.S. PATENT DOCUMENTS

| | | | |
|---|---|---|---|
| 5,960,447 A | 9/1999 | Holt et al. | |
| 6,023,270 A | 2/2000 | Brush, II et al. | |
| 6,044,147 A | 3/2000 | Hollier | |
| RE36,919 E | 10/2000 | Park | |
| 6,181,351 B1 | 1/2001 | Merrill et al. | |
| RE37,052 E | 2/2001 | Park | |
| 6,223,165 B1 | 4/2001 | Lauffer | |
| 6,385,586 B1 | 5/2002 | Dietz | |
| 6,650,793 B1 | 11/2003 | Lund et al. | |
| 6,772,195 B1 | 8/2004 | Hatlelid et al. | |
| 6,804,417 B1 | 10/2004 | Lund et al. | |
| 6,834,265 B2 | 12/2004 | Balasuriya | |
| 6,842,779 B1 | 1/2005 | Nishizawa | |
| 6,952,675 B1 * | 10/2005 | Tahara | G10L 15/08 704/255 |
| 6,961,700 B2 | 11/2005 | Mitchell et al. | |
| 7,342,587 B2 | 3/2008 | Danzig et al. | |
| 7,392,189 B2 | 6/2008 | Hennecke et al. | |
| 7,451,079 B2 | 11/2008 | Oudeyer | |
| 7,467,089 B2 | 12/2008 | Roth et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,886,012 B2 | 2/2011 | Bedi et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| RE43,993 E | 2/2013 | Park | |
| 8,384,719 B2 | 2/2013 | Reville et al. | |
| RE44,054 E | 3/2013 | Kim | |
| RE44,068 E | 3/2013 | Park | |
| RE44,106 E | 3/2013 | Park | |
| 8,396,708 B2 | 3/2013 | Park et al. | |
| RE44,121 E | 4/2013 | Park | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,473,290 B2 | 6/2013 | Pi et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,532,985 B2 | 9/2013 | Seltzer et al. | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,117,446 B2 | 8/2015 | Bao et al. | |
| 9,123,337 B2 | 9/2015 | Cross et al. | |
| 9,223,786 B1 | 12/2015 | Hamrick et al. | |
| 9,241,184 B2 | 1/2016 | Weerasinghe | |
| 9,256,860 B2 | 2/2016 | Herger et al. | |
| 9,269,346 B2 | 2/2016 | Conkie et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,336,782 B1 | 5/2016 | Patel | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,532,364 B2 | 12/2016 | Fujito | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,646,603 B2 | 5/2017 | Kadirkamanathan | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,767,789 B2 | 9/2017 | Radebaugh | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,074,360 B2 | 9/2018 | Kim | |
| 10,074,381 B1 | 9/2018 | Cowburn | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,158,589 B2 | 12/2018 | Collet et al. | |
| 10,192,555 B2 | 1/2019 | Lovitt | |
| 10,204,137 B2 | 2/2019 | Shim et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,348,662 B2 | 7/2019 | Baldwin et al. | |
| 10,362,219 B2 | 7/2019 | Wilson et al. | |
| 10,432,559 B2 | 10/2019 | Baldwin et al. | |
| 10,454,857 B1 | 10/2019 | Blackstock et al. | |
| 10,475,225 B2 | 11/2019 | Park et al. | |
| 10,496,875 B1 | 12/2019 | Chang | |
| 10,496,947 B1 | 12/2019 | Shaburov et al. | |
| 10,504,266 B2 | 12/2019 | Blattner et al. | |
| 10,555,138 B1 | 2/2020 | Wu et al. | |
| 10,573,048 B2 | 2/2020 | Ni et al. | |
| 10,599,917 B1 | 3/2020 | Shaburov et al. | |
| 10,623,666 B2 | 4/2020 | Charlton et al. | |
| 10,643,104 B1 | 5/2020 | Xue et al. | |
| 10,656,797 B1 | 5/2020 | Alvi et al. | |
| 10,657,695 B2 | 5/2020 | Chand et al. | |
| 10,657,701 B2 | 5/2020 | Osman et al. | |
| 10,679,428 B1 | 6/2020 | Chen et al. | |
| 10,762,174 B2 | 9/2020 | Denton et al. | |
| 10,770,059 B2 | 9/2020 | Scodary et al. | |
| 10,805,248 B2 | 10/2020 | Luo et al. | |
| 10,824,654 B2 | 11/2020 | Chang et al. | |
| 10,872,451 B2 | 12/2020 | Sheth et al. | |
| 10,880,246 B2 | 12/2020 | Baldwin et al. | |
| 10,895,964 B1 | 1/2021 | Grantham et al. | |
| 10,896,534 B1 | 1/2021 | Smith et al. | |
| 10,915,924 B1 | 2/2021 | Soloff | |

(56) References Cited

U.S. PATENT DOCUMENTS

| | | |
|---|---|---|
| 10,933,311 B2 | 3/2021 | Brody et al. |
| 10,936,858 B1 | 3/2021 | Chang |
| 10,938,758 B2 | 3/2021 | Allen et al. |
| 10,964,082 B2 | 3/2021 | Amitay et al. |
| 10,972,806 B1 | 4/2021 | Brody et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,017,233 B2 | 5/2021 | Charlton et al. |
| 11,024,101 B1 | 6/2021 | Chepizhenko et al. |
| 11,030,789 B2 | 6/2021 | Chand et al. |
| 11,036,781 B1 | 6/2021 | Baril et al. |
| 11,063,891 B2 | 7/2021 | Voss |
| 11,068,141 B1 | 7/2021 | Barton et al. |
| 11,069,103 B1 | 7/2021 | Blackstock et al. |
| 11,080,917 B2 | 8/2021 | Monroy-hernández et al. |
| 11,099,643 B1 | 8/2021 | Miller et al. |
| 11,112,945 B1 | 9/2021 | Al Majid et al. |
| 11,128,586 B2 | 9/2021 | Al Majid et al. |
| 11,157,557 B2 | 10/2021 | Mashrabov et al. |
| 11,164,353 B2 | 11/2021 | Luo et al. |
| 11,165,734 B1 | 11/2021 | Desserrey et al. |
| 11,169,675 B1 | 11/2021 | Anvaripour et al. |
| 11,176,723 B2 | 11/2021 | Krishnan Gorumkonda et al. |
| 11,188,190 B2 | 11/2021 | Blackstock et al. |
| 11,189,070 B2 | 11/2021 | Jahangiri et al. |
| 11,189,104 B2 | 11/2021 | Goodrich et al. |
| 11,195,341 B1 | 12/2021 | Canberk et al. |
| 11,199,957 B1 | 12/2021 | Alvi et al. |
| 11,210,467 B1 | 12/2021 | Carvalho et al. |
| 11,210,850 B2 | 12/2021 | Goodrich et al. |
| 11,212,383 B2 | 12/2021 | Voss et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,604,925 B1 | 3/2023 | Lee et al. |
| 11,875,392 B1 | 1/2024 | Freed et al. |
| 12,142,257 B2 | 11/2024 | Harazi et al. |
| 2002/0067362 A1 | 6/2002 | Agostino Nocera et al. |
| 2002/0169644 A1 | 11/2002 | Greene |
| 2005/0010390 A1* | 1/2005 | Shimohata .............. G06F 40/42 704/5 |
| 2005/0091064 A1 | 4/2005 | Weeks |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2008/0177541 A1* | 7/2008 | Satomura ................ G10L 15/22 704/E15.044 |
| 2009/0016617 A1 | 1/2009 | Bregman-amitai et al. |
| 2009/0024393 A1 | 1/2009 | Kaneyasu |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0171663 A1 | 7/2009 | Badt et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0238658 A1 | 9/2013 | Burris |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0089343 A1 | 3/2014 | Burris et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2015/0356101 A1 | 12/2015 | Cohen et al. |
| 2015/0356102 A1 | 12/2015 | Cohen et al. |
| 2016/0078859 A1 | 3/2016 | Luan et al. |
| 2016/0134840 A1 | 5/2016 | Mcculloch |
| 2016/0234149 A1 | 8/2016 | Tsuda et al. |
| 2016/0275070 A1* | 9/2016 | Corston ................ G06F 40/253 |
| 2016/0329043 A1 | 11/2016 | Kim et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2017/0323638 A1* | 11/2017 | Malinowski .......... G10L 15/193 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0005017 A1* | 1/2019 | Winer ................ G06F 40/232 |
| 2019/0057616 A1 | 2/2019 | Cohen et al. |
| 2019/0097958 A1 | 3/2019 | Collet et al. |
| 2019/0156835 A1* | 5/2019 | Church .................. G10L 15/30 |
| 2019/0188920 A1 | 6/2019 | Mcphee et al. |
| 2019/0280997 A1 | 9/2019 | Baldwin et al. |
| 2019/0341024 A1* | 11/2019 | Aleksic ................ G10L 15/187 |
| 2019/0386941 A1 | 12/2019 | Baldwin et al. |
| 2020/0234480 A1 | 7/2020 | Volkov et al. |
| 2020/0241575 A1 | 7/2020 | Meisenholder et al. |
| 2020/0306637 A1 | 10/2020 | Baldwin et al. |
| 2020/0327884 A1 | 10/2020 | Bui et al. |
| 2020/0336454 A1 | 10/2020 | Grantham et al. |
| 2020/0349922 A1 | 11/2020 | Peyser et al. |
| 2020/0351353 A1 | 11/2020 | Al Majid et al. |
| 2020/0356760 A1 | 11/2020 | Li et al. |
| 2020/0358731 A1 | 11/2020 | Boyd et al. |
| 2020/0372127 A1 | 11/2020 | Denton et al. |
| 2020/0393915 A1 | 12/2020 | Brendel et al. |
| 2020/0410575 A1 | 12/2020 | Grantham et al. |
| 2020/0412864 A1 | 12/2020 | Al Majid et al. |
| 2020/0412975 A1 | 12/2020 | Al Majid et al. |
| 2021/0065448 A1 | 3/2021 | Goodrich et al. |
| 2021/0065464 A1 | 3/2021 | Goodrich et al. |
| 2021/0067756 A1 | 3/2021 | Goodrich et al. |
| 2021/0067836 A1 | 3/2021 | Hornsby et al. |
| 2021/0074047 A1 | 3/2021 | Sheth et al. |
| 2021/0076173 A1 | 3/2021 | Monroy-Hernandez et al. |
| 2021/0081088 A1 | 3/2021 | Voss |
| 2021/0081699 A1 | 3/2021 | Ronen et al. |
| 2021/0089179 A1 | 3/2021 | Grantham et al. |
| 2021/0097245 A1 | 4/2021 | Monroy-Hernández |
| 2021/0097743 A1 | 4/2021 | Krishnan Gorumkonda et al. |
| 2021/0104087 A1 | 4/2021 | Smith et al. |
| 2021/0125154 A1 | 4/2021 | Lewis et al. |
| 2021/0151042 A1 | 5/2021 | Park et al. |

(56) References Cited

U.S. PATENT DOCUMENTS

| | | |
|---|---|---|
| 2021/0158804 A1* | 5/2021 | Tiwari .................. G10L 15/183 |
| 2021/0165559 A1 | 6/2021 | Voss et al. |
| 2021/0165998 A1 | 6/2021 | Cao et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0200390 A1 | 7/2021 | Luo et al. |
| 2021/0201392 A1 | 7/2021 | Aghdaii et al. |
| 2021/0203627 A1 | 7/2021 | Luo et al. |
| 2021/0203628 A1 | 7/2021 | Luo et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243487 A1 | 8/2021 | Kotsopoulos et al. |
| 2021/0243503 A1 | 8/2021 | Kotsopoulos et al. |
| 2021/0264668 A1 | 8/2021 | Goodrich et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0303075 A1 | 9/2021 | Cowburn et al. |
| 2021/0303077 A1 | 9/2021 | Anvaripour et al. |
| 2021/0303110 A1 | 9/2021 | Giacalone et al. |
| 2021/0303114 A1 | 9/2021 | Apanovych et al. |
| 2021/0303860 A1 | 9/2021 | Anvaripour et al. |
| 2021/0304429 A1 | 9/2021 | Cowburn et al. |
| 2021/0304449 A1 | 9/2021 | Mourkogiannis |
| 2021/0304451 A1 | 9/2021 | Fortier et al. |
| 2021/0304505 A1 | 9/2021 | Anvaripour et al. |
| 2021/0304506 A1 | 9/2021 | Mourkogiannis et al. |
| 2021/0304754 A1 | 9/2021 | Fortier et al. |
| 2021/0306290 A1 | 9/2021 | Voss |
| 2021/0306451 A1 | 9/2021 | Heikkinen et al. |
| 2021/0312523 A1 | 10/2021 | Luo et al. |
| 2021/0312533 A1 | 10/2021 | Luo et al. |
| 2021/0312672 A1 | 10/2021 | Luo et al. |
| 2021/0312678 A1 | 10/2021 | Luo et al. |
| 2021/0312682 A1 | 10/2021 | Krishnan Gorumkonda et al. |
| 2021/0312690 A1 | 10/2021 | Krishnan Gorumkonda et al. |
| 2021/0319612 A1 | 10/2021 | Monroy-Hernandez et al. |
| 2021/0319625 A1 | 10/2021 | Goodrich et al. |
| 2021/0319801 A1 | 10/2021 | Kim et al. |
| 2021/0327415 A1* | 10/2021 | Park ..................... G10L 15/16 |
| 2021/0334993 A1 | 10/2021 | Woodford |
| 2021/0335004 A1 | 10/2021 | Zohar et al. |
| 2021/0335350 A1 | 10/2021 | Ribas Machado Das Neves et al. |
| 2021/0352029 A1 | 11/2021 | Lo et al. |
| 2021/0357075 A1 | 11/2021 | Nayar et al. |
| 2021/0360056 A1 | 11/2021 | Baron et al. |
| 2021/0374839 A1 | 12/2021 | Luo et al. |
| 2021/0382585 A1 | 12/2021 | Collins et al. |
| 2021/0382587 A1 | 12/2021 | Heikkinen et al. |
| 2021/0382616 A1 | 12/2021 | Gale et al. |
| 2021/0383373 A1 | 12/2021 | Eirinberg et al. |
| 2021/0385179 A1 | 12/2021 | Heikkinen et al. |
| 2021/0385180 A1 | 12/2021 | Al Majid et al. |
| 2021/0387090 A1 | 12/2021 | Eirinberg et al. |
| 2021/0387097 A1 | 12/2021 | Desserrey et al. |
| 2021/0387099 A1 | 12/2021 | Desserrey et al. |
| 2021/0389851 A1 | 12/2021 | Al Majid et al. |
| 2021/0389852 A1 | 12/2021 | Desserrey et al. |
| 2021/0389866 A1 | 12/2021 | Al Majid et al. |
| 2021/0390118 A1 | 12/2021 | Gorkin et al. |
| 2021/0390745 A1 | 12/2021 | Rykhliuk et al. |
| 2021/0390784 A1 | 12/2021 | Smith et al. |
| 2021/0392096 A1 | 12/2021 | Desserrey et al. |
| 2021/0392098 A1 | 12/2021 | Gorkin et al. |
| 2021/0392459 A1 | 12/2021 | Gorkin et al. |
| 2021/0392460 A1 | 12/2021 | Gorkin et al. |
| 2021/0404831 A1 | 12/2021 | Drummond et al. |
| 2021/0405831 A1 | 12/2021 | Mourkogiannis et al. |
| 2021/0405832 A1 | 12/2021 | Brown et al. |
| 2021/0406447 A1 | 12/2021 | Hermann et al. |
| 2021/0406543 A1 | 12/2021 | Drummond et al. |
| 2021/0406965 A1 | 12/2021 | Anvaripour et al. |
| 2021/0407163 A1 | 12/2021 | Chai et al. |
| 2021/0407506 A1 | 12/2021 | Drummond et al. |
| 2021/0407533 A1 | 12/2021 | Cowburn et al. |
| 2021/0409356 A1 | 12/2021 | Luo et al. |
| 2021/0409357 A1 | 12/2021 | Brody et al. |
| 2021/0409502 A1 | 12/2021 | Chepizhenko et al. |
| 2021/0409517 A1 | 12/2021 | Luo et al. |
| 2021/0409535 A1 | 12/2021 | Mourkogiannis et al. |
| 2021/0409610 A1 | 12/2021 | Mandia et al. |
| 2021/0409612 A1 | 12/2021 | Mandia et al. |
| 2021/0409614 A1 | 12/2021 | Luo et al. |
| 2021/0409616 A1 | 12/2021 | Chan et al. |
| 2022/0012929 A1 | 1/2022 | Blackstock et al. |
| 2022/0130378 A1 | 4/2022 | Avijeet |
| 2023/0197064 A1 | 6/2023 | Bekker et al. |
| 2023/0252972 A1 | 8/2023 | Harazi et al. |

FOREIGN PATENT DOCUMENTS

| | | |
|---|---|---|
| CN | 108351988 A | 7/2018 |
| CN | 108885639 A | 11/2018 |
| CN | 108885795 A | 11/2018 |
| CN | 109791635 A | 5/2019 |
| CN | 109844761 A | 6/2019 |
| CN | 109863532 A | 6/2019 |
| CN | 109964236 A | 7/2019 |
| CN | 109997129 A | 7/2019 |
| CN | 110168478 A | 8/2019 |
| CN | 110192395 A | 8/2019 |
| CN | 110199245 A | 9/2019 |
| CN | 110291547 A | 9/2019 |
| CN | 110383344 A | 10/2019 |
| CN | 110462616 A | 11/2019 |
| CN | 110495166 A | 11/2019 |
| CN | 107111434 B | 11/2020 |
| CN | 118401996 A | 7/2024 |
| CN | 118679517 A | 9/2024 |
| EP | 2184092 A2 | 5/2010 |
| EP | 2634714 A2 | 9/2013 |
| JP | 2001230801 A | 8/2001 |
| JP | 5497931 B2 | 3/2014 |
| KR | 101445263 B1 | 9/2014 |
| KR | 20180132124 A | 12/2018 |
| KR | 20190088503 A | 7/2019 |
| KR | 20200017000 A | 2/2020 |
| KR | 20200071782 A | 6/2020 |
| KR | 20210052575 A | 5/2021 |
| KR | 20210052584 A | 5/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194299 A1 | 12/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2020073944 A1 | 4/2020 |
| WO | WO-2020197766 A1 | 10/2020 |
| WO | WO-2020226777 A1 | 11/2020 |
| WO | WO-2020231522 A1 | 11/2020 |
| WO | WO-2020264550 A1 | 12/2020 |
| WO | WO-2021042134 A1 | 3/2021 |
| WO | WO-2021067988 A1 | 4/2021 |
| WO | WO-2021119662 A1 | 6/2021 |
| WO | WO-2021133960 A1 | 7/2021 |
| WO | WO-2021138630 A1 | 7/2021 |
| WO | WO-2021154998 A1 | 8/2021 |
| WO | WO-2021155249 A1 | 8/2021 |
| WO | WO-2021194755 A1 | 9/2021 |
| WO | WO-2021194855 A1 | 9/2021 |
| WO | WO-2021194856 A1 | 9/2021 |

(56) References Cited

FOREIGN PATENT DOCUMENTS

| | | |
|---|---|---|
| WO | WO-2021195404 A1 | 9/2021 |
| WO | WO-2021201999 A1 | 10/2021 |
| WO | WO-2021202191 A1 | 10/2021 |
| WO | WO-2021202241 A1 | 10/2021 |
| WO | WO-2021203118 A1 | 10/2021 |
| WO | WO-2021203119 A1 | 10/2021 |
| WO | WO-2021211851 A1 | 10/2021 |
| WO | WO-2021216999 A1 | 10/2021 |
| WO | WO-2021222198 A1 | 11/2021 |
| WO | WO-2021222225 A1 | 11/2021 |
| WO | WO-2021236287 A1 | 11/2021 |
| WO | WO-2021237088 A1 | 11/2021 |
| WO | WO-2021242686 A1 | 12/2021 |
| WO | WO-2021242771 A1 | 12/2021 |
| WO | WO-2021252202 A1 | 12/2021 |
| WO | WO-2021252218 A1 | 12/2021 |
| WO | WO-2021252232 A1 | 12/2021 |
| WO | WO-2021252233 A1 | 12/2021 |
| WO | WO-2021252383 A1 | 12/2021 |
| WO | WO-2021252386 A1 | 12/2021 |
| WO | WO-2021252501 A1 | 12/2021 |
| WO | WO-2021252662 A1 | 12/2021 |
| WO | WO-2021252759 A1 | 12/2021 |
| WO | WO-2021252763 A1 | 12/2021 |
| WO | WO-2021253048 A1 | 12/2021 |
| WO | WO-2021257280 A1 | 12/2021 |
| WO | WO-2021257401 A1 | 12/2021 |
| WO | WO-2021257450 A1 | 12/2021 |
| WO | WO-2021257455 A1 | 12/2021 |
| WO | WO-2021257616 A1 | 12/2021 |
| WO | WO-2021257619 A1 | 12/2021 |
| WO | WO-2021263208 A1 | 12/2021 |
| WO | WO-2021263210 A1 | 12/2021 |
| WO | WO-2023114127 A1 | 6/2023 |
| WO | WO-2023154323 A1 | 8/2023 |
| WO | WO-2024015782 A1 | 1/2024 |

OTHER PUBLICATIONS

"International Application Serial No. PCT US2023 069953, International Search Report mailed Oct. 23, 2023", 4 pgs.

"International Application Serial No. PCT US2023 069953, Written Opinion mailed Oct. 23, 2023", 6 pgs.

Aleksic, Petar, "Bringing Contextual Information to Google Speech Recognition", INTERSPEECH 2015, [Online]. Retrieved from the Internet:URL: https: static.googleusercontent.com media research. google.com en pubs archive 43819.pdf, (Sep. 6, 2015), 468-472.

Bellegarda, "Statistical Language Model Adaptation: Review and Perspectives", Speech Communication 42, (2004), 93-108.

"U.S. Appl. No. 17/644,970, Advisory Action mailed Oct. 11, 2024", 4 pgs.

"U.S. Appl. No. 17/644,970, Examiner Interview Summary mailed Sep. 16, 2024", 2 pgs.

"U.S. Appl. No. 17/644,970, Final Office Action mailed Jul. 25, 2024", 13 pgs.

"U.S. Appl. No. 17/644,970, Non Final Office Action mailed Mar. 21, 2024", 11 pgs.

"U.S. Appl. No. 17/644,970, Non Final Office Action mailed Dec. 4, 2024", 13 pgs.

"U.S. Appl. No. 17/644,970, Response filed Jun. 18, 2024 to Non Final Office Action mailed Mar. 21, 2024", 10 pgs.

"U.S. Appl. No. 17/644,970, Response filed Sep. 12, 2024 to Final Office Action mailed Jul. 25, 2024", 9 pgs.

"U.S. Appl. No. 17/667,128, Non Final Office Action mailed Feb. 26, 2024", 7 pgs.

"U.S. Appl. No. 17/667,128, Notice of Allowance mailed Jul. 5, 2024", 9 pgs.

"U.S. Appl. No. 17/667,128, Response filed May 24, 2024 to Non Final Office Action mailed Feb. 26, 2024", 8 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-US/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-US/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"International Application Serial No. PCT/US2022/052518, International Preliminary Report on Patentability mailed Jun. 27, 2024", 6 pgs.

"International Application Serial No. PCT/US2022/052518, International Search Report mailed Mar. 20, 2023", 4 pgs.

"International Application Serial No. PCT/US2022/052518, Written Opinion mailed Mar. 20, 2023", 4 pgs.

"International Application Serial No. PCT/US2023/012594, International Preliminary Report on Patentability mailed Aug. 22, 2024", 12 pgs.

"International Application Serial No. PCT/US2023/012594, International Search Report mailed Jun. 12, 2023", 5 pgs.

"International Application Serial No. PCT/US2023/012594, Invitation to Pay Additional Fees mailed Apr. 18, 2023", 10 pgs.

"International Application Serial No. PCT/US2023/012594, Written Opinion mailed Jun. 12, 2023", 10 pgs.

"KenLM Faster and Smaller Language Model Queries", [Online]. Retrieved from the Internet: <https://github.com/kpu/kenlm>, (Accessed Jan. 3, 2025), 6 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Fatima, Syeda Maryam, et al., "Neural Style Transfer Based Voice Mimicking for Personalized Audio Stories", AI4TV '20, Session 1: Video Analytics and Storytelling, (Oct. 2020), 6 pgs.

Ghannay, S, et al., "End-To-End Named Entity And Semantic Concept Extraction From Speech", IEEE Spoken Language Technology Workshop (SLT), (Dec. 2018), 8 pgs.

Li, Tao, et al., "Controllable cross-speaker emotion transfer for end-to-end speech synthesis", Journal of Latex Class Files, vol. 14, No. 8, (Aug. 2015), 12 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from

(56) References Cited

OTHER PUBLICATIONS the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tao, Li, et al., "Cross-speaker emotion disentangling and transfer for end-to-end speech synthesis", Journal of Class Files vol. 14 No 8, (Aug. 2015), 1-12.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

\* cited by examiner

BOOSTING WORDS IN AUTOMATED SPEECH RECOGNITION

TECHNICAL FIELD

The present disclosure generally relates to the technical field of automated speech recognition (ASR).

BACKGROUND

As the popularity of social networking grows, social networks are expanding their capabilities. To improve ease of use, social networks are integrating more and more functions such that a user may accomplish many or even most of their computer-based tasks within the social network itself. Some social networks allow users to control various operations using speech.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
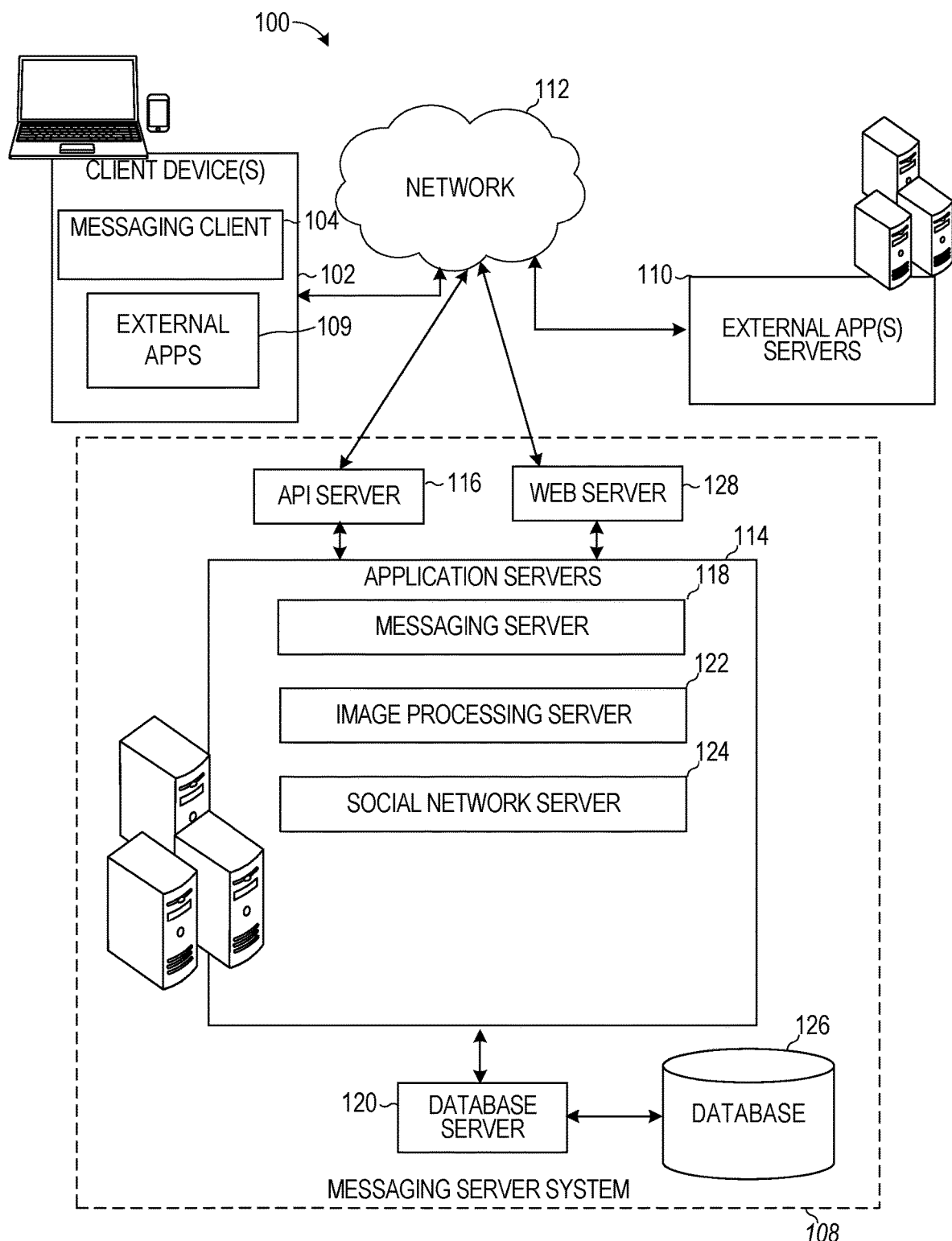
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Automatic speech recognition (ASR) engines are often composed of an acoustic component and a decoder. The acoustic component converts the user voice into logits of inferred characters of phonemes, and the decoder applies a beam search and a language model to determine the best combinations/alternatives of characters/phonemes as a resulting transcript. In this setup, the decoder role is on increasing probabilities of acoustic options, according to their likelihood score (LM score) in the language model. A language model is used to determine the likelihood of a sequence of words, according to its appearance in a large language corpus. The language model initially examines the corpus, extracts a distribution model from it, which it then uses in runtime to determine the likelihood of a given sequence of words. Likelihood of an n-gram can be referred to as n-gram score or LM score.

A language model (LM) typically uses a list of n-grams (sequence of n words—unigrams, bigrams, 3-grams, and so on usually until n=6) and their likelihood in the language as seen in the training corpus. The LM also implements smoothing, which is a method to determine likelihood of unseen n-gram in the corpus, by looking at a "back-off" probability for the n-1 prefix of the n-gram together with the likelihood of the n-1 suffix. For example, if the n-gram I_am_here_already is not in the LM, its likelihood would be calculated by the probability of am_here_already*(backoff of I_am_here).

Some systems provide context boosting operations to allow users to specify a set of predefined words and phrases as commands for activating specific functionalities. Boosting such words increases the ASR accuracy for users who attempt to perform the specific functionalities. To perform such boosting operations, LM hacking changes the LM model scores as a preprocessing step for a known set of boosted words that will be used in runtime, or modifying its results dynamically, for an ad-hoc set of boosting words given in runtime. Specifically, when a set of words is expected in a certain utterance, a common method to increase the accuracy of the ASR transcription or recognition is by increasing the likelihood scores of these words in the decoder or LM. This method is often referred to as "boosting" or applying "word context". Typical systems apply boosting without considering how such boosting affects other words or n-grams in the LM. This causes the likelihood of boosted words to become too high overriding the acoustic details and results in returning the boosted words even when they are not used by the user. This "over-boosting" essentially degrades the ASR transcription accuracy on such utterances.

The disclosed techniques improve the ASR recognition of certain boosted words in an intelligent manner. The disclosed techniques safely increase the probability of transcribing an expected set of words/utterances, while safely maintaining probabilities of other alternatives that do not use the word. The disclosed techniques allow increasing the ASR transcription accuracy without any degradation on other utterances. The disclosed techniques can be implemented as part of the decoder (referred to as the online alternative), or by altering the language model used by the decoder as a preprocessing step (referred to as the offline alternative).

According to the disclosed techniques, a language model is accessed that includes a plurality of n-grams, where each of the plurality of n-grams includes a respective sequence of words and corresponding LM score. The disclosed techniques select a target word to boost in the language model and receive a boosting factor for the target word. The boosting factor can be received from a developer of an experience (e.g., messaging application feature), such as an augmented reality (AR) experience that utilizes the LM. The disclosed techniques identify a subset of n-grams of the plurality of n-grams that include the target word and adjust the LM score of a first n-gram of the subset of n-grams based the LM scores of the subset of n-grams and the boosting factor. By considering LM scores of other n-grams in the LM when modifying a score (increasing or decreasing) in the LM for a specific word, the LM can boost the specific word recognition without adversely impacting the recognition of other words and phrases in the LM.

In some examples, the boosting factor can be temporarily applied based on context. Namely, while a particular feature (or context) associated with the boosting factor is being accessed or executed, the boosting factor is applied. This causes the LM score of the associated word or phrase to be increased/decreased while the particular feature is accessed or executed. After the context ends or after the particular feature stopes being accessed or executed, the LM score of the associated word or phrase is returned to its original value.

In some examples, the boosting factor is applied in the absolute sense in which the specified percentile input in association with the boosting factor is used to directly modify and replace the LM score of a target word or phrase. In such circumstances, a distribution of scores of other words with the same prefix (same sequence of words not including the associated word or phrase as the suffix) can be obtained. The percentile that matches the specified percentile that is input is identified and used to retrieve the word corresponding to the matching percentile in the distribution. The LM score of the word is used to replace the LM score of the target word or phrase.

In other cases, the boosting factor is applied in the relative sense. In such cases, the boosting factor can be received as a specified percentile which is applied relative to percentiles or LM scores of other words or phrases. Namely, the distribution of scores of other words with the same prefix (same sequence of words not including the associated word or phrase as the suffix) can be obtained. The percentile of the target word or phrase is identified within the distribution of scores and a search for all prefixes having a greater percentile is performed. The identified prefixes are used to generate a new distribution of associated LM scores. The boosting factor is used to determine one of the percentiles in the new distribution that matches the percentile of the boosting factor. The LM score of the prefix associated with the matching percentile is used to replace the LM score of the target word or phrase.

This significantly improves the overall ability for the social network system to perform ASR to control operations and perform transcriptions of audio. In this way, the disclosed techniques provide a much more intuitive, robust, and engaging experience. This reduces the amount of resources needed to perform routine social networking tasks and operations.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109, using Applications Program Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, watermarks (combined indications of messages and reactions being read or presented to a user of a client device 102) and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., watermarks, commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
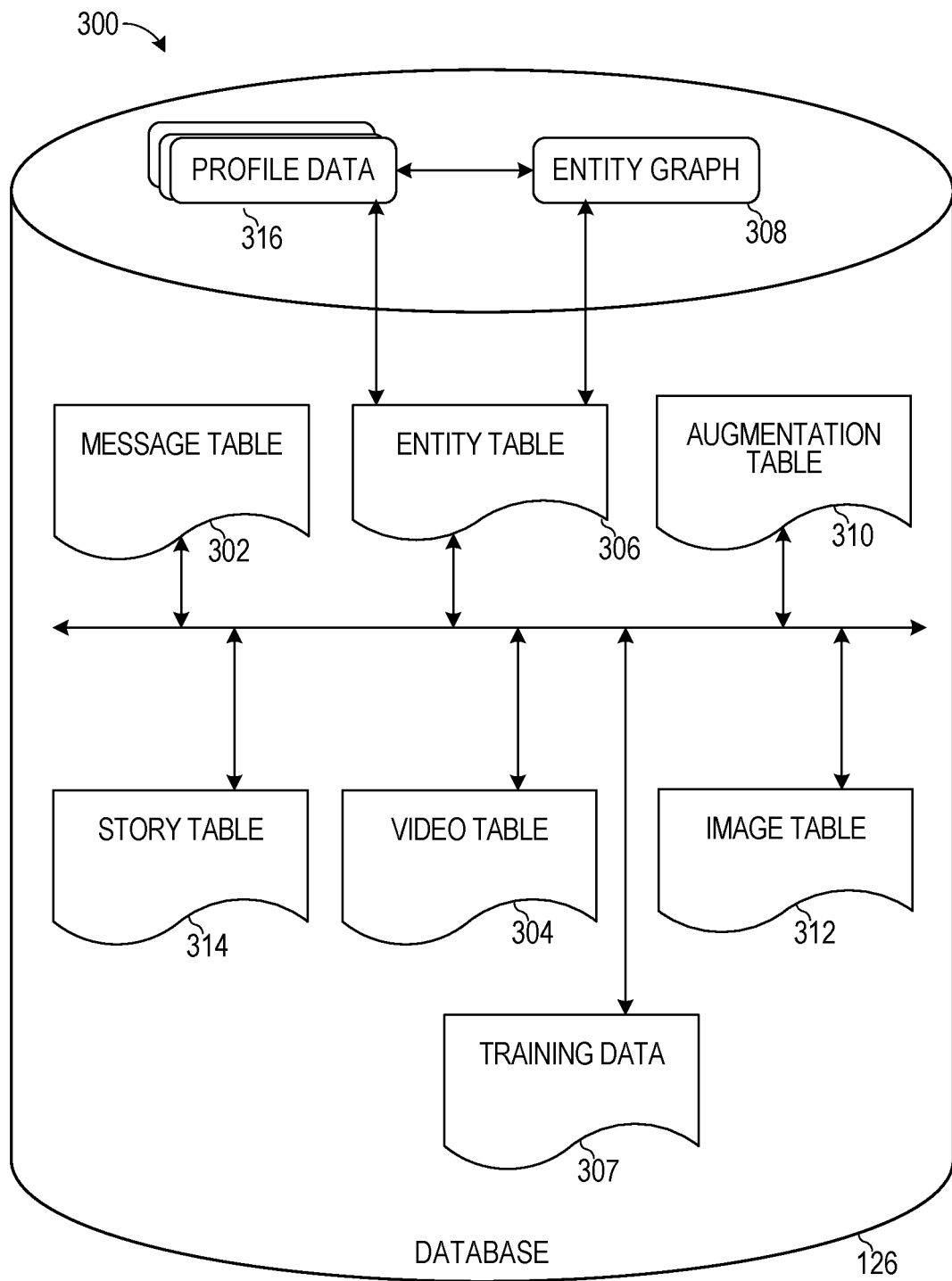
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a.*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends)

external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

In some examples, the messaging client 104 can implement one or more functionalities of the word boosting ASR system 230, discussed below in connection with FIG. 5.

System Architecture

Figure 2:
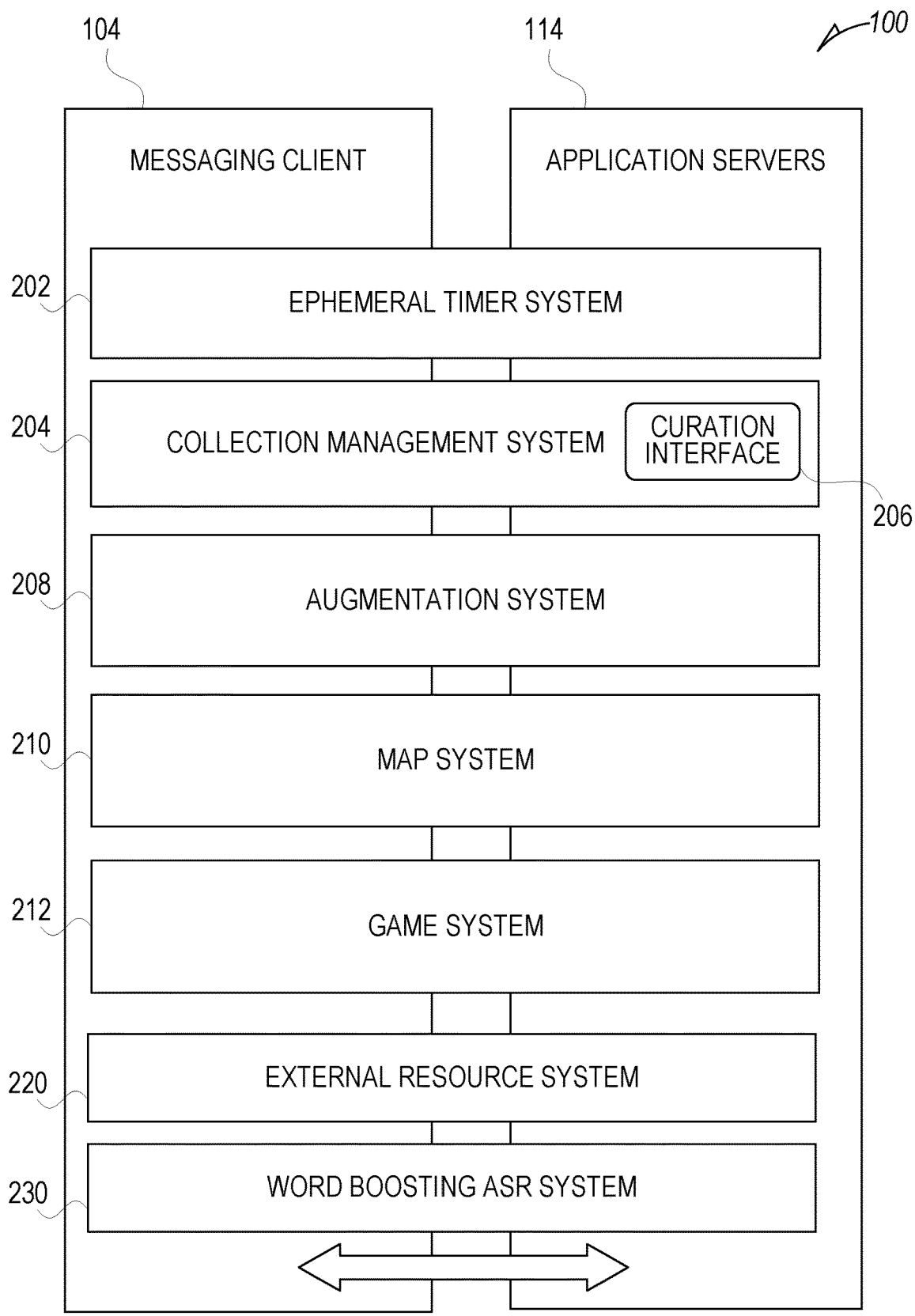
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a word boosting ASR system 230.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking— based features in which one or more augmented reality items are modified based on movement of facial features detected in a received or captured image or video. As another example, the media overlays may include the audio clip-based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions, and supports the presentation of map-based media content and messages by the messaging client 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items). Based on an intent classification of the speech input and accurate transcription of the speech input, the messaging client 104 can perform game-based functions.

The external resource system 220 provides an interface for the messaging client 104 to communicate with external app(s) servers 110 to launch or access external resources. Each external resource (apps) server 110 hosts, for example, a markup language (e.g., HTML5)—based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used. Based on an intent classification of the speech input and accurate transcription of the speech input, the messaging client 104 can perform external resource-based functions.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a Web ViewJavaScript-Bridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The word boosting ASR system 230 receives input that selects a target word and a boosting factor associated with the target word. The target word can be a word that is associated with a particular AR experience and/or functionality of the messaging client 104. The target word can be boosted by the word boosting ASR system 230 to increase the likelihood that the ASR engine recognizes an n-gram that includes the target word (e.g., as a suffix of the n-gram) or to decrease the likelihood that the ASR engine recognizes an n-gram that includes the target word (e.g., as a suffix of the n-gram). In this way, there is a lower likelihood of incorrect transcriptions and speech recognition based operations when the particular AR experience and/or functionality of the messaging client 104 is used.

Figure 5:
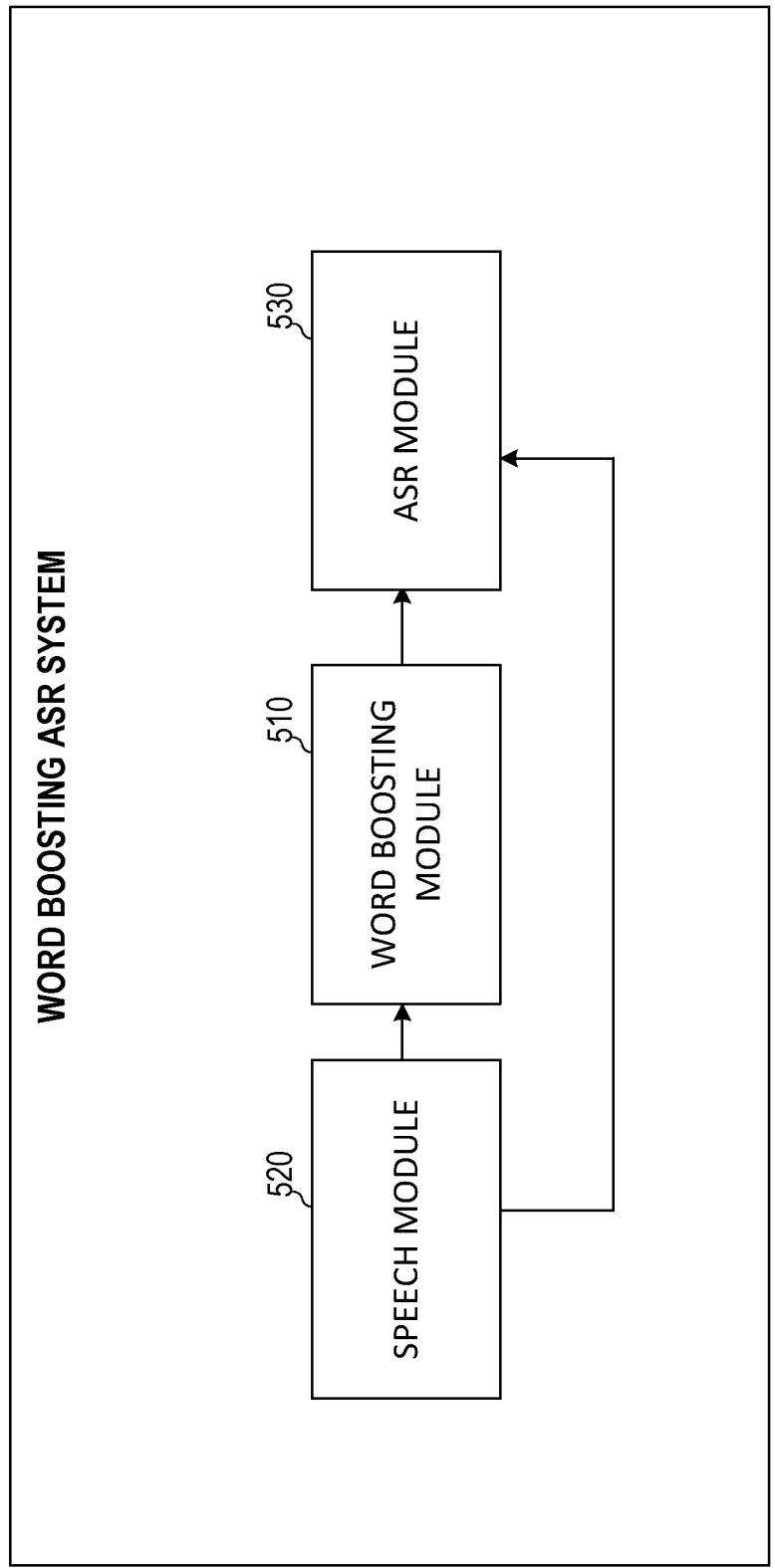
FIG. 5 illustrates the word boosting automatic speech recognition (ASR) system, in accordance with some examples.

Further details of the word boosting ASR system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Training data 307 stores a language model that includes one or more n-grams. Each of the one or more n-grams includes a word or a sequence of words along with associated LM scores. An ASR engine uses the language model stored as the training data 307 to process verbal input received from a user and perform speech-based operations based on the processed verbal input. In some examples, the ASR engine generates a transcription of the verbal input using the language model. In some examples, one or more words in the language model can be boosted temporarily or permanently to increase the likelihood of matching a particular n-gram that features the one or more words. In such cases, the LM score associated with the n-gram can be temporarily or permanently increased or decreased relative to the LM scores of other n-grams.

Data Communications Architecture

Figure 4:
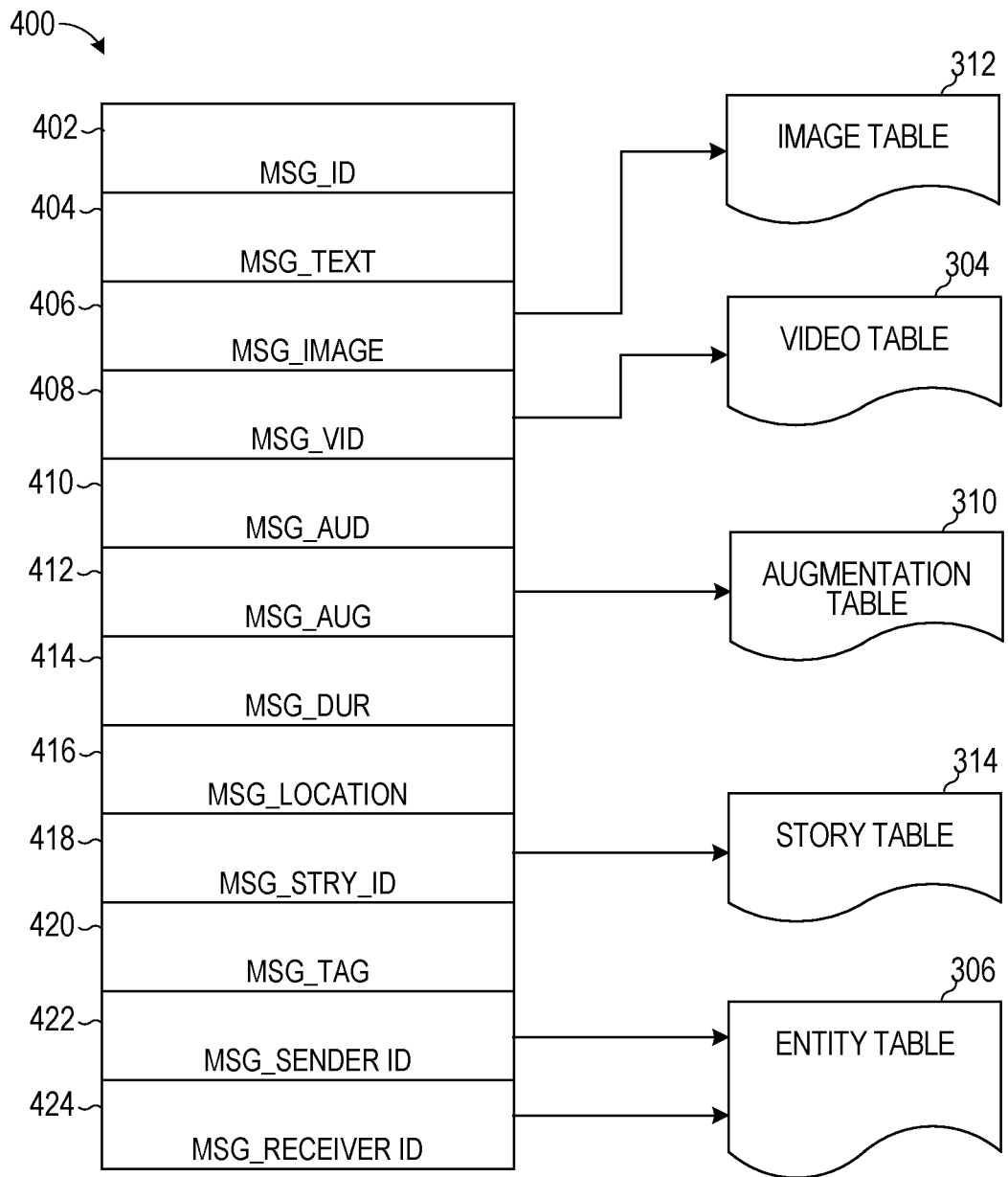
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Word Boosting Asr System

FIG. 5 illustrates the word boosting ASR system 230 according to some examples. The word boosting ASR system 230 includes a speech module 520, an ASR module 530, and a word boosting module 510. While all of the components are drawn as being part of the word boosting ASR system 230, any one or all of the components can be implemented by separate devices and be in geographically disparate locations.

In some examples, the word boosting ASR system 230 accesses a language model that includes a plurality of n-grams, each of the plurality of n-grams comprising a respective sequence of words and corresponding LM score. The word boosting ASR system 230 selects a target word to boost in the language model and receives a boosting factor for the target word. The word boosting ASR system 230 identifies a target n-gram in the language model that includes the target word and identifies a subset of n-grams of the plurality of n-grams that include words in a portion of the target n-gram. The word boosting ASR system 230 adjusts the LM score of the target n-gram based on the LM scores of the subset of n-grams and the boosting factor. In some cases, the boosting factor includes a percentile. In some cases, the target word is selected in real-time for temporary use in response to receiving a user request to access an augmented reality experience associated with the target word. In such cases, the LM score of the target n-gram is returned to an original value after the augmented reality experience is terminated.

In some examples, the target word is a suffix of the target n-gram, wherein portions of the target n-gram leading up to the suffix comprise a prefix of the target n-gram. The word boosting ASR system 230 identifies the subset of n-grams by searching the plurality of n-grams to identify n-grams that include the prefix of the target n-gram. In some cases, the word boosting ASR system 230 obtains the LM score of the first n-gram in the subset of n-grams and generates a group of n-grams of the plurality of n-grams that are each associated with a LM score that is greater than the LM score of the first n-gram. The word boosting ASR system 230 computes a distribution of LM scores of the group of n-grams. The word boosting ASR system 230 selects a target LM score within the distribution of LM scores that corresponds to the percentile of the boosting factor and replaces the LM score of the target n-gram with the target LM score.

In some examples, the word boosting ASR system 230 computes a distribution of LM scores of the subset of n-grams and selects a target LM score within the distribution of LM scores that corresponds to the percentile of the boosting factor. The word boosting ASR system 230 replaces the LM score of the target n-gram with the target LM score.

In some cases, the word boosting ASR system 230 determines that the target n-gram is associated with a token corresponding to a start of a sentence. The word boosting ASR system 230 adjusts the LM score of the target n-gram based on determining that the first n-gram is associated with the token corresponding to the start of the sentence. In such cases, the word boosting ASR system 230 prevents the LM score of the target n-gram from being adjusted in response to determining that the target n-gram is not associated with the token corresponding to the start of the sentence.

In some examples, the word boosting ASR system 230 receives a given word that is excluded from the language model. The word boosting ASR system 230 computes similarity values between the given word and each of the plurality of words in the language model and selects the target word based on determining that the similarity value of the target word transgresses a similarity threshold. In an example, the target word and the given word are synonyms or antonyms.

In some examples, the word boosting ASR system 230 replaces the target word in the target n-gram with the given word to generate a new n-gram. The word boosting ASR system 230 associates the new n-gram with a LM score computed based on the LM scores of the subset of n-grams and the boosting factor.

In some examples, the word boosting ASR system 230 receives a given word that is excluded from the language model and identifies a collection of unigrams in the language model. The word boosting ASR system 230 computes a distribution of LM scores of the collection of unigrams and selects a given LM score from the distribution of LM scores corresponding to the boosting factor. In some cases, the word boosting ASR system 230 generates a new n-gram comprising the given word and associates the given LM score with the new n-gram.

In some examples, the word boosting ASR system 230 obtains acoustic details of each of the plurality of n-grams. In such cases, the word boosting ASR system 230 generates acoustic details of the target word and computes acoustic similarity values between the acoustic details of the target word and the acoustic details of each of the plurality of n-grams. The word boosting ASR system 230 identifies the subset of n-grams including the plurality of n-grams that have acoustic similarity values that transgress an acoustic similarity threshold. The acoustic similarity values can be computed based on phoneme distances between phonemes of the plurality of n-grams and phonemes of the target word.

The speech module 520 is configured to receive an audio stream that includes one or more words. The audio stream can be received by recording a user speaking the one or more words and generating an audio file. In some examples, the audio stream is received through a messaging system or chat system from another user. In some examples, the audio stream is downloaded from the Internet and received from one or more websites. In some examples, the audio stream is selected from a set of pre-recorded audio streams. In such cases, a user interface is presented to a user in which a plurality of audio stream listings are presented and identified by respective icons or options. In response to receiving a user selection of an icon or option, the corresponding audio stream of the plurality of audio streams is retrieved by the speech module 520. The speech module 520 provides the audio stream including the one or more words to the ASR module 530.

The ASR module 530 processes the audio stream received from the speech module 520. The ASR module 530 is configured to generate a transcription of the audio stream based on a language model that includes words or phrases that have been boosted by the word boosting module 510.

The word boosting module 510 receives a target word and a boosting factor. In some cases, the target word and corresponding boosting factor are received by the word boosting module 510 in real-time, such as based on metadata or configuration information associated with an AR experience or feature of a messaging client 104. In such cases, the word boosting module 510 applies the boost to the target word (to increase or decrease likelihood of recognition of an n-gram featuring the word) temporarily while the AR experience or feature of the messaging client 104 is being used or is launched. In some examples, the word boosting module 510 receives the target word and boosting factor during programming of the ASR module 530 and, in such cases, the word boosting module 510 applies a permanent boost to the target word.

Figure 6:
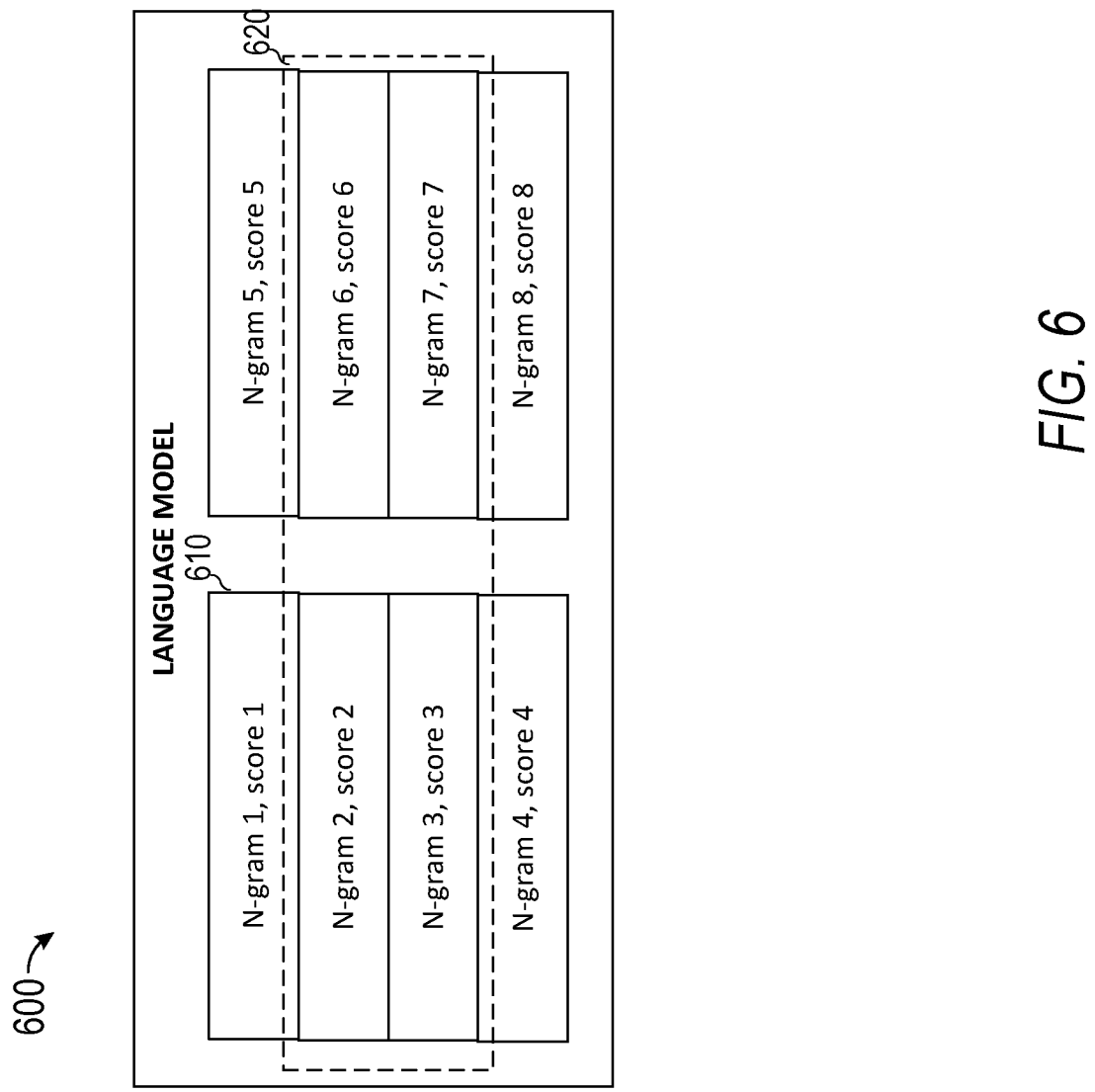
FIG. 6 illustrates an example language model, in accordance with some examples.

The word boosting module 510, in response to receiving the target word, searches a language model to identify a target n-gram that includes the target word. For example, the word boosting module 510 accesses the language model 600, shown in FIG. 6. The word boosting module 510 identifies a target n-gram 610 in the language model 600 that includes the target word, such as in the suffix of the n-gram 610. The word boosting module 510 retrieves a prefix portion of the n-gram 610, such as all of the words or phrases leading up to and excluding the target word. The word boosting module 510 searches the language model 600 to identify a subset of n-grams that include the prefix portion of the n-gram 610. For example, the word boosting module 510 determines that the subset of n-grams 620 includes sequences of words or phrases that match the prefix portion of the n-gram 610 and have a different suffix from the n-gram 610.

Figure 7:
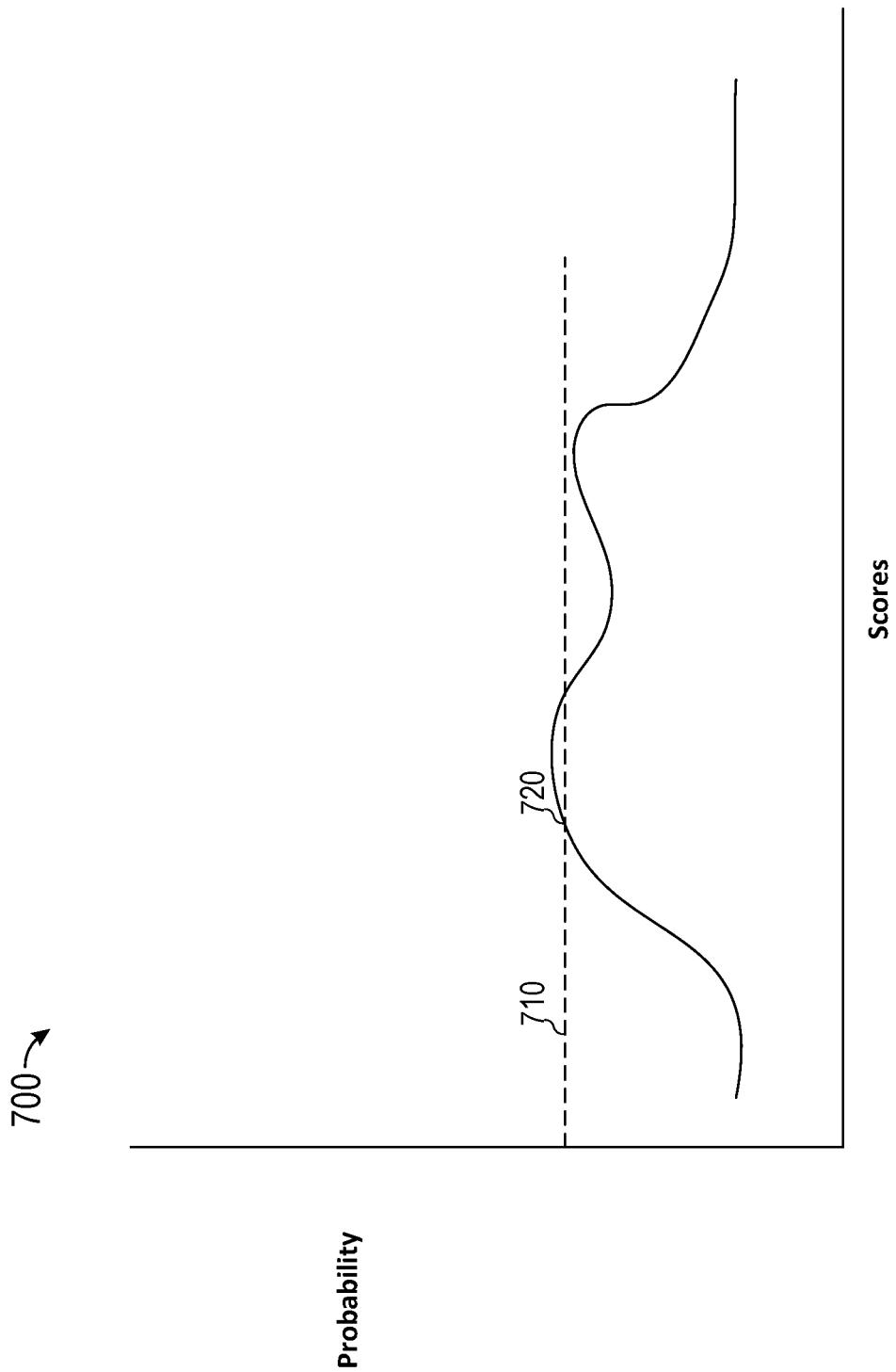
FIG. 7 is an example probability distribution of n-gram scores, in accordance with some examples.

In some examples, the word boosting module 510 obtains the scores of each of the n-grams in the subset of n-grams 620. In some examples, the word boosting module 510 generates a probability distribution 700, shown in FIG. 7, of all of the scores of the n-grams in the subset of n-grams 620.

The word boosting module 510 can receive the boosting factor as a percentile. In such cases, the word boosting module 510 searches the probability distribution 700 for the percentile 720 corresponding to the boosting factor 710. Once the percentile 720 corresponding to the boosting factor 710 has been identified, the word boosting module 510 identifies the score of the n-gram corresponding to the identified percentile 720 which the identified n-gram can be different from the n-gram 610 (e.g., the target n-gram that includes the target word). The word boosting module 510 then adjusts the score of the n-gram 610 to match the score of the identified n-gram corresponding to the percentile 720. In this way, the target n-gram (e.g., n-gram 610) is as likely to be recognized as the n-gram corresponding to the specified boosting factor.

In some examples, the word boosting module 510 obtains the LM score associated with the target n-gram. The word boosting module 510 includes or identifies the subset of n-grams that are associated with LM scores that are greater than the LM score of the target n-gram. Namely, the identified subset can exclude n-grams with lower LM scores than the target n-gram. The word boosting module 510 generates a probability distribution 700, shown in FIG. 7, of all of the scores of the n-grams in the subset of n-grams 620 that have higher LM scores than the target n-gram. The word boosting module 510 searches the probability distribution 700 for the percentile 720 corresponding to the boosting factor 710. Once the percentile 720 corresponding to the boosting factor 710 has been identified, the word boosting module 510 identifies the score of the n-gram corresponding to the identified percentile 720 which the identified n-gram can be different from the n-gram 610 (e.g., the target n-gram that includes the target word). The word boosting module 510 then adjusts the score of the n-gram 610 to match the score of the identified n-gram corresponding to the percentile 720.

For example, the language model 600 can include the following n-grams:

a_b_c_d
a_b_c_e
a_b_c_f
a_b_c_g
a_b_c
b_c_d
a_b_e
a_b_f
a_b_g
a_b
b_c
c_d
a
b
d
e
f
g

In an example, the word boosting module 510 receives input that selects a word "d" in the language model 600 to boost with a boosting factor of $89^{th}$ percentile. The word boosting module 510 searches the language model 600 to identify a subset of n-grams in which the word "d" is a suffix, such as S={a_b_c_d, b_c_d, c_d, d}. The word boosting module 510 selects a first target n-gram, such as a_b_c_d. For the first target n-gram, the word boosting module 510 retrieves the prefix of the first target n-gram, which excludes the word "d," such as "a_b_c". The word boosting module 510 identifies all of the n-grams in the language model 600 that include the same prefix as the first target n-gram and defines a probability P of all such prefixes. In an example, the word boosting module 510 finds all of the prefixes in the language model 600 with the same suffix "d" with higher scores than the first target n-gram. The word boosting module 510 defines the probability P={score (a_b_c_X|a_b_c_X in P and score(a_b_c_X)>score (a_b_c_d)}.

The word boosting module 510 computes the distribution of P and computes the $89^{th}$ percentile in the distribution of P. The word boosting module 510 obtains the score of the $89^{th}$ percentile in the distribution of P and overwrites the score of the first target n-gram with the score associated with the n-gram in the $89^{th}$ percentile. The word boosting module 510 performs the same process for each n-gram in the set S, such as a second n-gram b_c_d, a third n-gram c_d, and fourth n-gram d.

In some examples, the word boosting module 510 determines that the target word is not included (is excluded) from the language model 600. In such cases, the word boosting module 510 can find n-grams that include synonyms or antonyms of the target word in the suffix to generate a new n-gram. For example, the word boosting module 510 can identify a synonym or antonym of the target word. The word boosting module 510 identifies a target n-gram in which the synonym or antonym is in the suffix. The word boosting module 510 then generates the probability distribution of the scores of other n-grams that include the same prefix as the target n-gram and obtains the score of the n-gram with the percentile that matches the boosting factor. The word boosting module 510 generates a new n-gram that includes the same prefix and the target word as the suffix and associates the score of the n-gram with the percentile that matches the boosting factor with the new n-gram.

In some examples, the word boosting module 510 determines that the target word is not included (is excluded) from the language model 600. In such cases, the word boosting module 510 can find unigrams in the language model 600. The word boosting module 510 then generates the probability distribution of the scores of the unigrams and obtains the score of the unigram with the percentile that matches the boosting factor. The word boosting module 510 generates a new n-gram that includes the target word and associates the score of the unigram with the percentile that matches the boosting factor with the new n-gram.

In some examples, the word boosting module 510 can obtain acoustic details of the target word. The word boosting module 510 obtains acoustic details of each suffix in the language model 600 n-grams. The word boosting module 510 compares the acoustic details of the target word to the acoustic details of each suffix in the language model 600 of n-grams. For example, the word boosting module 510 computes phoneme distances between phonemes of the suffixes of the plurality of n-grams in the language model 600 and phonemes of the target word. The word boosting module 510 selects a target n-gram that includes the suffix that has acoustic details that are within a threshold proximity or threshold similarity value (e.g., the similarity value between the acoustic details of the target n-gram suffix and the target word are exceeds or transgresses a similarity threshold). The word boosting module 510 can then generate the probability distribution of the scores of the n-grams that include the same prefix as the identified target n-gram. The word boosting module 510 obtains the score of the n-gram with the percentile that matches the boosting factor. The word boosting module 510 adjusts the score of the target n-gram to match the score of the n-gram with the percentile that matches the boosting factor.

In some examples, the word boosting module 510 can condition boosting or modifying the score of the target n-gram based on whether the target n-gram is associated with a start of a sentence. Specifically, the word boosting module 510 can, after or before computing the score of the n-gram associated with the probability corresponding to the boosting factor, access a start-of-sentence indicator associated with the target n-gram. The start-of-sentence indicator can indicate whether the n-gram is associated with starting a sentence or is in the middle of a sentence. For example, in the n-gram "take a snap", such an n-gram is associated with the start-of-sentence indicator because this n-gram usually appears at the start of a sentence. In the n-gram "take a nap", such an n-gram is not associated with the start-of-sentence indicator because this n-gram is usually preceded by other words, such as "I would like to." The word boosting module 510 can increase/decrease the score of the target n-gram in response to determining that the target n-gram is associated with the start-of-sentence indicator. The word boosting module 510 can prevent increasing/decreasing the score of the target n-gram in response to determining that the target n-gram is not associated with the start-of-sentence indicator.

Figure 8:
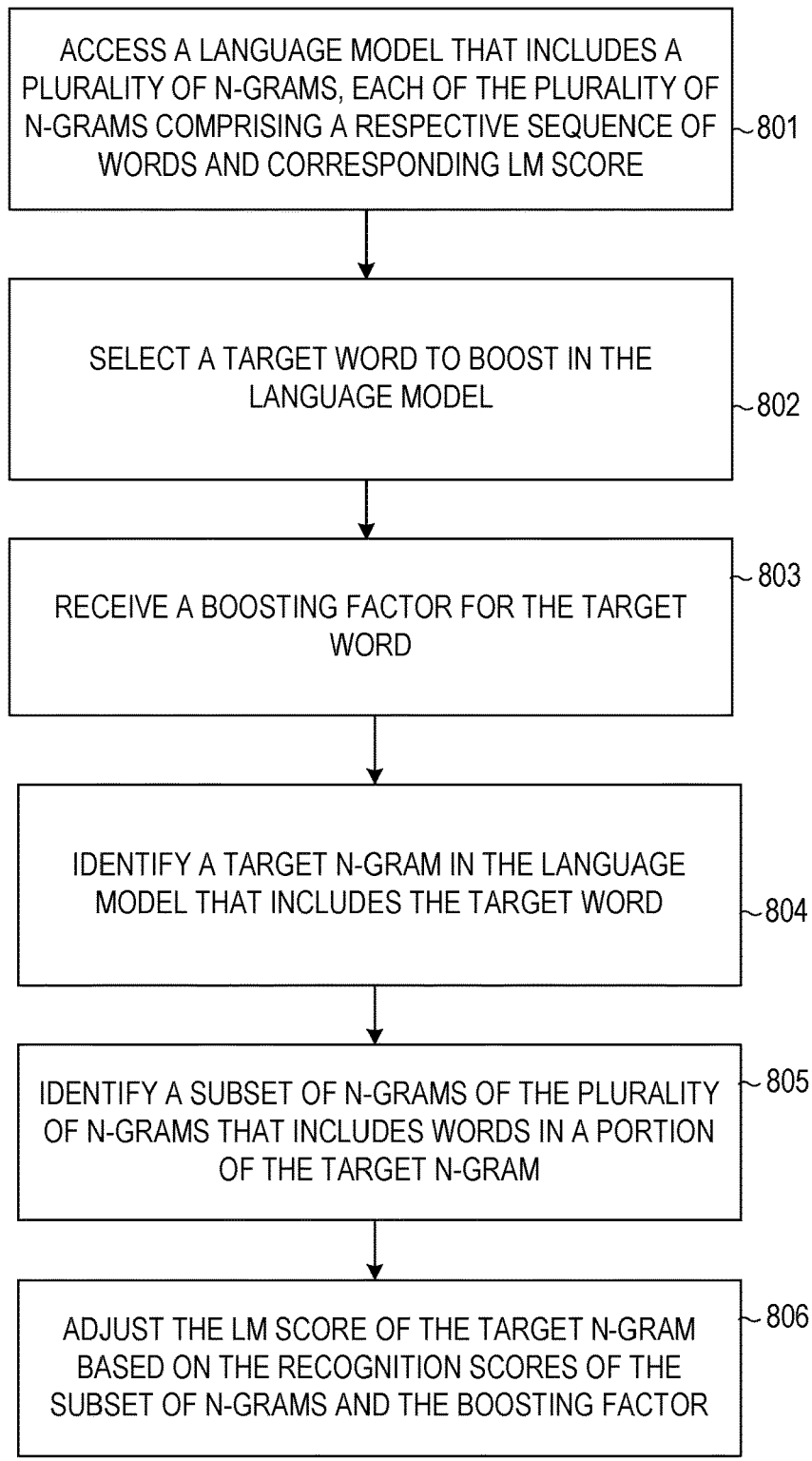
FIG. 8 is a flowchart illustrating example operations of the word boosting ASR system, according to some examples.

FIG. 8 is a flowchart illustrating example operations of the messaging client 104 in performing process 800, according to some examples. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other examples at least some of the operations of the process 800 may be deployed on various other hardware configurations. The operations in the process 800 can be performed in any order, in parallel, or may be entirely skipped and omitted.

At operation 801, the word boosting ASR system 230 accesses a language model that includes a plurality of n-grams, each of the plurality of n-grams comprising a respective sequence of words and corresponding LM score, as discussed above.

At operation 802, the word boosting ASR system 230 selects a target word to boost in the language model, as discussed above.

At operation 803, the word boosting ASR system 230 receives a boosting factor for the target word, as discussed above.

At operation 804, the word boosting ASR system 230 identifies a target n-gram in the language model that includes the target word, as discussed above.

At operation 805, the word boosting ASR system 230 identifies a subset of n-grams of the plurality of n-grams that include words in a portion of the target n-gram, as discussed above.

At operation 806, the word boosting ASR system 230 adjusts the LM score of the target n-gram based on the LM scores of the subset of n-grams and the boosting factor, as discussed above. In some instances, LM scores are referred to as recognition scores.

Machine Architecture

Figure 9:
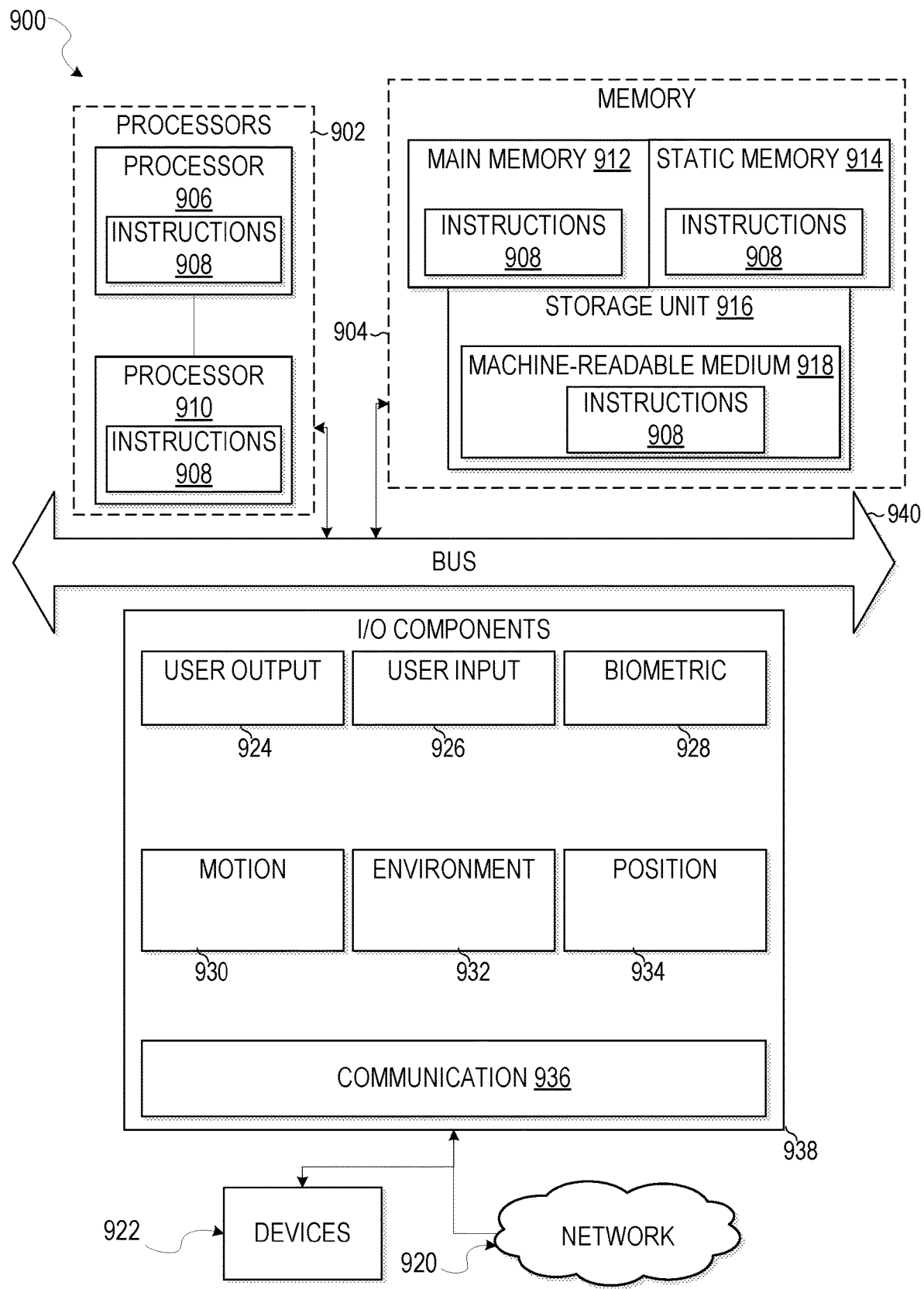
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 912, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple camera systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
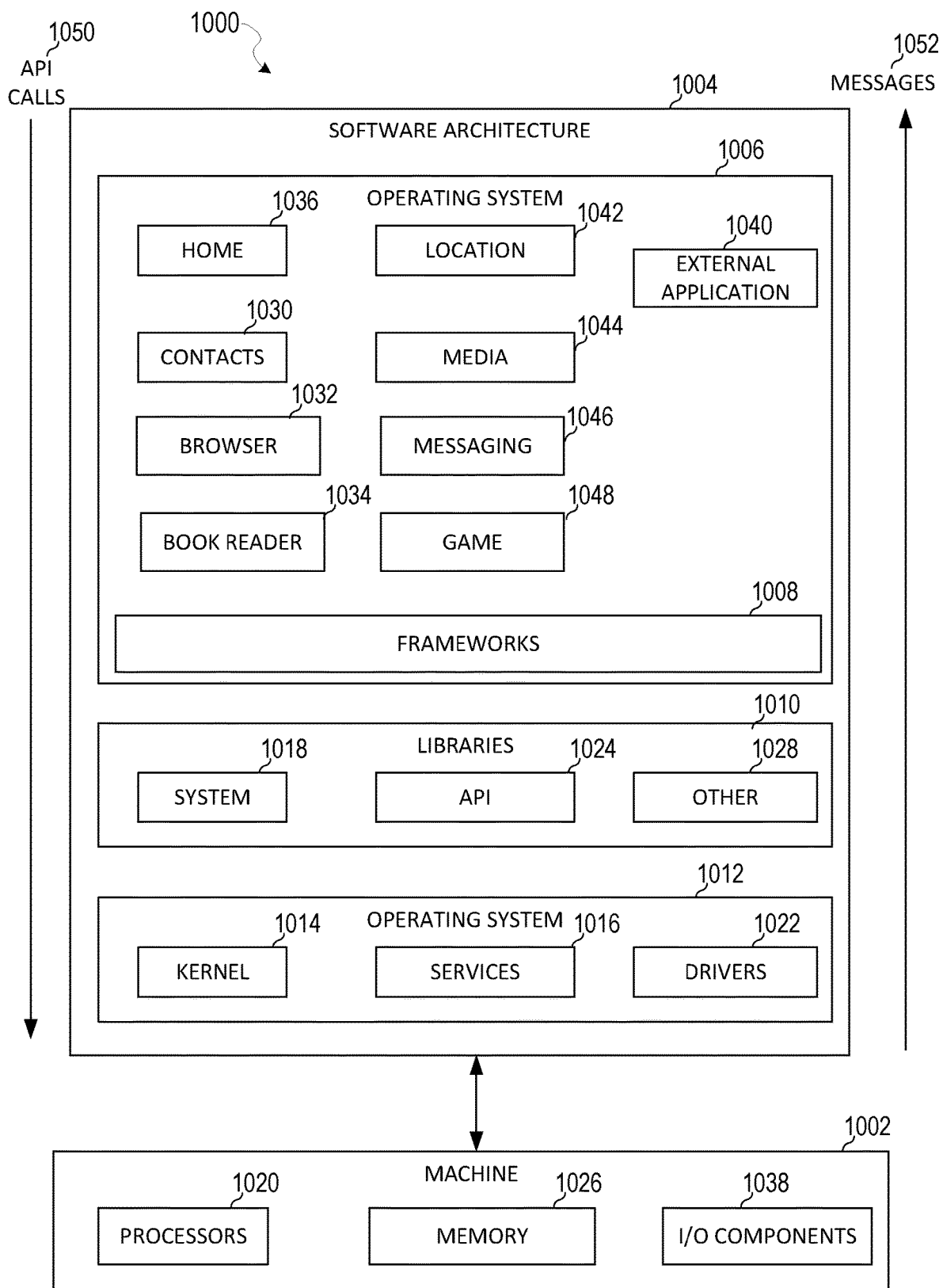
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the external application 1040 can invoke the API calls 1050 provided by the operating system 1012 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various some examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other some examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
accessing, by one or more processors of an automatic speech recognition (ASR) engine, a language model (LM) that includes a plurality of n-grams, each of the plurality of n-grams comprising a respective sequence of words and corresponding LM score, the ASR engine comprising an acoustic component and a decoder;
converting, by the acoustic component, voice input into logits of inferred characters of phonemes;
selecting a target word to boost in the LM;
receiving input comprising a boosting factor including a specific boosting value for the target word;
identifying a target n-gram in the LM that includes the target word;
identifying a subset of n-grams of the plurality of n-grams that includes words in a portion of the target n-gram excluding the target word;
within the subset of n-grams that exclude the target word, identifying an individual n-gram having an individual LM score that corresponds to the specific boosting value of the boosting factor received in the input;
adjusting the LM score of the target n-gram using the individual LM score of the individual n-gram, within the subset of n-grams that exclude the target word, that corresponds to the specific boosting value of the boosting factor received in the input; and
processing, by the decoder, the logits of inferred characters of phonemes using the LM comprising the adjusted LM score of the target n-gram to generate a transcription of the voice input.

2. The method of claim 1, wherein the target word is a suffix of the target n-gram, wherein portions of the target n-gram leading up to the suffix comprise a prefix of the target n-gram, wherein identifying the subset of n-grams comprises searching the plurality of n-grams to identify n-grams comprising the prefix of the target n-gram.

3. The method of claim 1, wherein the boosting factor comprises a percentile.

4. The method of claim 3, further comprising:
obtaining the LM score of the target n-gram; and
generating a group of n-grams of the subset of n-grams that are each associated with a LM score that is greater than the LM score of the target n-gram.

5. The method of claim 4, further comprising:
computing a distribution of LM scores of the group of n-grams;
selecting a target LM score within the distribution of LM scores that corresponds to the percentile of the boosting factor; and
replacing the LM score of the target n-gram with the target LM score.

6. The method of claim 3, further comprising:
computing a distribution of LM scores of the subset of n-grams;
selecting a target LM score within the distribution of LM scores that corresponds to the percentile of the boosting factor; and
replacing the LM score of the target n-gram with the target LM score.

7. The method of claim 1, further comprising:
determining that the target n-gram is associated with a token corresponding to a start of a sentence, wherein the LM score of the target n-gram is adjusted based on determining that the target n-gram is associated with the token corresponding to the start of the sentence.

8. The method of claim 7, further comprising:
preventing the LM score of the target n-gram from being adjusted in response to determining that the target n-gram is not associated with the token corresponding to the start of the sentence.

9. The method of claim 1, further comprising:
receiving a given word that is excluded from the language model;
computing similarity values between the given word and each of the plurality of words in the language model; and
selecting the target word based on determining that the similarity value of the target word transgresses a similarity threshold.

10. The method of claim 9, wherein the target word and the given word are synonyms.

11. The method of claim 9, further comprising:
replacing the target word in the target n-gram with the given word to generate a new n-gram; and
associating the new n-gram with a LM score computed based on the LM scores of the subset of n-grams and the boosting factor.

12. The method of claim 1, further comprising:
receiving a given word that is excluded from the language model;
identifying a collection of unigrams in the language model;

computing a distribution of LM scores of the collection of unigrams; and selecting a given LM score from the distribution of LM scores corresponding to the boosting factor.

13. The method of claim 12, further comprising:
generating a new n-gram comprising the given word; and
associating the given LM score with the new n-gram.

14. The method of claim 1, further comprising:
obtaining acoustic details of each of the plurality of n-grams;
generating acoustic details of the target word; and
computing acoustic similarity values between the acoustic details of the target word and the acoustic details of each of the plurality of n-grams.

15. The method of claim 14, further comprising:
identifying the target n-gram from the plurality of n-grams that has acoustic similarity values that transgress an acoustic similarity threshold.

16. The method of claim 14, wherein the acoustic similarity values are computed based on phoneme distances between phonemes of the plurality of n-grams and phonemes of the target word.

17. The method of claim 1, wherein the target word is selected in real-time for temporary use in response to receiving a user request to access an augmented reality experience associated with the target word.

18. The method of claim 17, wherein the LM score of the target n-gram is returned to an original value after the augmented reality experience is terminated.

19. A system comprising:
at least one processor configured to perform operations comprising:
accessing, by an automatic speech recognition (ASR) engine, a language model (LM) that includes a plurality of n-grams, each of the plurality of n-grams comprising a respective sequence of words and corresponding LM score, the ASR engine comprising an acoustic component and a decoder;
converting, by the acoustic component, voice input into logits of inferred characters of phonemes;
selecting a target word to boost in the LM;
receiving input comprising a boosting factor including a specific boosting value for the target word;
identifying a target n-gram in the LM that includes the target word;
identifying a subset of n-grams of the plurality of n-grams that includes words in a portion of the target n-gram excluding the target word;
within the subset of n-grams that exclude the target word, identifying an individual n-gram having an individual LM score that corresponds to the specific boosting value of the boosting factor received in the input;
adjusting the LM score of the target n-gram using the individual LM score of the individual n-gram, within the subset of n-grams that exclude the target word, that corresponds to the specific boosting value of the boosting factor received in the input; and
processing, by the decoder, the logits of inferred characters of phonemes using the LM comprising the adjusted LM score of the target n-gram to generate a transcription of the voice input.

20. A non-transitory machine-readable storage medium that includes instructions that, when executed by one or more processors, cause the one or more processors to perform operations comprising:
accessing, by an automatic speech recognition (ASR) engine, a language model (LM) that includes a plurality of n-grams, each of the plurality of n-grams comprising a respective sequence of words and corresponding LM score, the ASR engine comprising an acoustic component and a decoder;
converting, by the acoustic component, voice input into logits of inferred characters of phonemes;
selecting a target word to boost in the LM;
receiving input comprising a boosting factor including a specific boosting value for the target word;
identifying a target n-gram in the LM that includes the target word;
identifying a subset of n-grams of the plurality of n-grams that includes words in a portion of the target n-gram excluding the target word;
within the subset of n-grams that exclude the target word, identifying an individual n-gram having an individual LM score that corresponds to the specific boosting value of the boosting factor received in the input;
adjusting the LM score of the target n-gram using the individual LM score of the individual n-gram, within the subset of n-grams that exclude the target word, that corresponds to the specific boosting value of the boosting factor received in the input; and
processing, by the decoder, the logits of inferred characters of phonemes using the LM comprising the adjusted LM score of the target n-gram to generate a transcription of the voice input.

\* \* \* \* \*